United States Patent Office 3,340,475
Patented Sept. 5, 1967

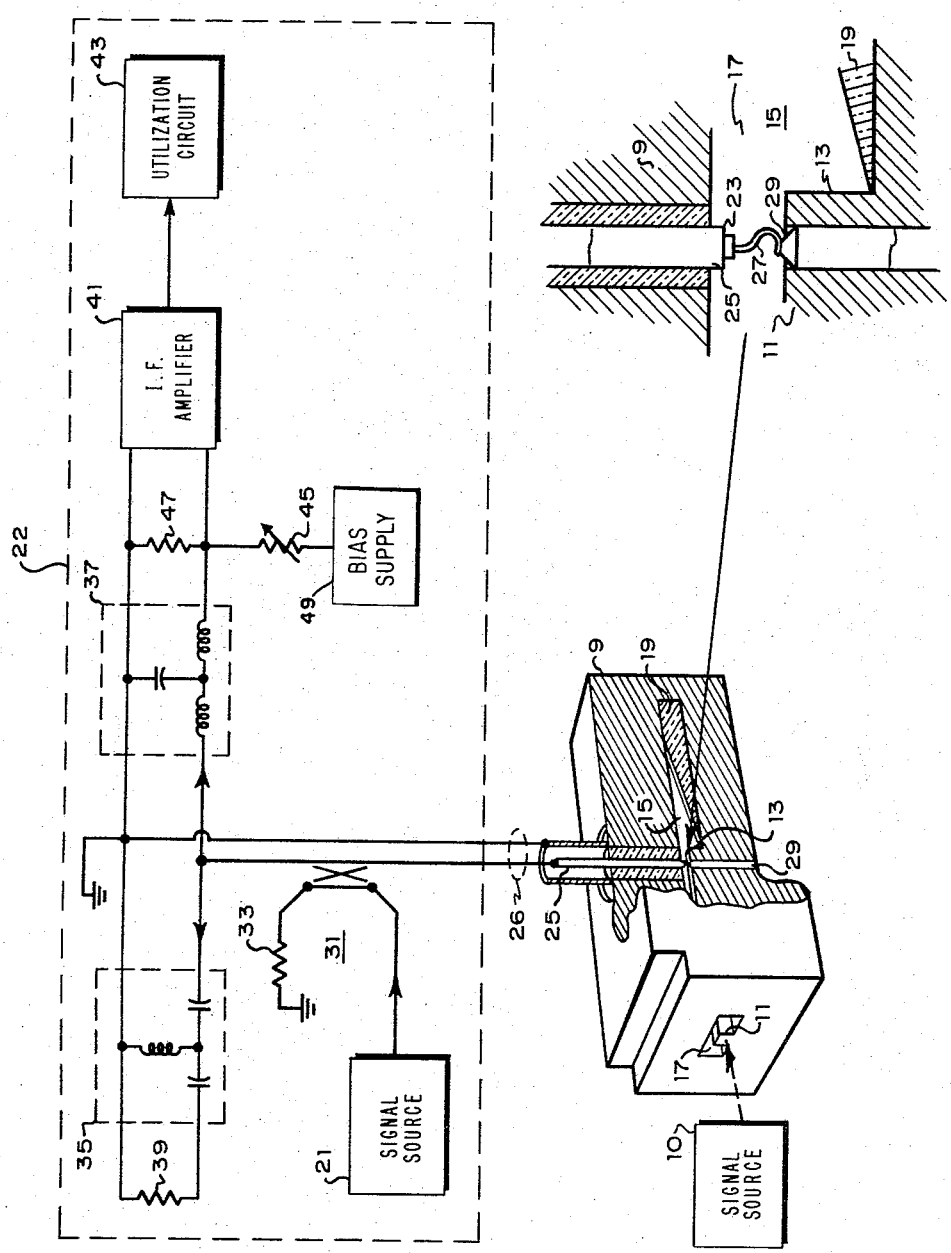

3,340,475
SIGNAL MIXER HAVING A COMMON INPUT AND OUTPUT PORT
Richard W. Anderson, Los Altos, Calif., assignor to Hewlett-Packard Company, Palo Alto, Calif., a corporation of California
Filed May 5, 1964, Ser. No. 365,066
4 Claims. (Cl. 325—449)

ABSTRACT OF THE DISCLOSURE

A high frequency signal mixer has an input port for receiving an applied signal and has another port for receiving a signal from a local oscillator and for providing an output as the modulation products of the applied and local oscillator signals.

---

This invention relates to signal mixers and more particularly to broadband apparatus having two signal ports for producing an intermediate frequency signal as the combination of an applied microwave signal and a signal from a local oscillator. Apparatus of this type may be conveniently attached to microwave equipment at a given test point remote from a measuring instrument and be connected to the measuring instrument using a single length of coaxial cable. This obviates the need for connecting the microwave equipment under test directly to the measuring instrument using complex waveguide apparatus.

Accordingly, it is an object of the present invention to provide a crystal signal mixer which operates over a broadband of microwave frequencies.

It is another object of the present invention to provide a signal mixer which may be attached to microwave equipment at test points remote from a measuring instrument and which may be connected to the instrument with a single length of coaxial line.

In accordance with the illustrated embodiment of the present invention, a point contact semiconductor diode is disposed across the gap of a section of ridged waveguide to receive the microwave signal applied to the section. Signal from a local oscillator within a measuring instrument is applied to the diode through a coaxial cable. The intermediate frequency signal resulting from the combination of the microwave signal and the local oscillator signal is reflected back to the measuring instrument along the cable. Apparatus within the measuring instrument receives the signals on the cable and provides an indication related to the output of the signal mixer of the present invention.

Other and incidental objects of the present invention will be apparent from a reading of this specification and an inspection of the accompanying drawing which shows a pictorial and schematic diagram of the signal mixer of the present invention.

Referring now to the drawing, there is shown a ridged waveguide section 9 disposed to receive microwave signal from source 10. The section 9 has a microwave passage 17 containing a dielectric (say, air) and a ridge 11 which ends abruptly at step 13 within the section 9. A cavity 15 formed within the section 9 by the termination of the waveguide passage 17 and the step 13 in the ridge 11 is partially filled with microwave signal-absorbing material such as polyiron to form a tapered terminating load 19. This prevents reflections of microwave signal and acts as a relatively high impedance shunt across diode 23. The ridge 11 concentrates the electric field in the limited region within the passage 17 between the top of ridge 11 and the opposite broad wall. Thus, microwave signal within the waveguide passage 17 having its electric field concentrated in the gap above ridge 11 is mixed with signal from a local signal source 21 in the semiconductor diode 23 disposed near step 13 in the ridge 11. In lower frequency applications, high frequency signal may be conducted along a conductor disposed on a dielectric support within a conductive envelope. A diode may thus be disposed in the concentrated electric field between the conductor and envelope. The diode 23 is connected on one side to insulated post 25 and on the other side to spring contact 27 attached to grounded post 29. The insulated post 25 and the body of section 9 form a capacitor which shunts microwave signal appearing on the post 25. Signal from the local source 21 within the measuring instrument 22 is applied to insulated post 25 through connecting cable 26 from the directional coupler 31 connected to the source 21. Resistor 33 absorbs signal not directed to the cable 26. The modulation products including a selected intermediate frequency (I.F.) signal produced by the semiconductor diode 23 from the combination of the microwave signal in passage 11 and the local signal on post 25 are reflected back along the cable 26 to the two filters 35 and 37. The frequency of this I.F. signal is maintained fixed over a band of microwave signal frequencies by varying the frequency of signal from source 21. The high-pass filter 35 transmits to the load 39 the signals on cable 26 (including signal from source 21) having frequencies which are higher than the I.F. signal frequency, which signals are absorbed by load 39 to prevent reflections. The low-pass filter 37 passes the I.F. signal to amplifier 41 which amplifies the I.F. signal and applies it to the utilization circuit 43 which typically includes an indicating device such as a cathode-ray display tube. The biasing circuit including resistors 45 and 47 and supply terminal 49 applies a biasing signal to the diode 23. This bias signal is adjusted by varying resistor 45 to maximize the mixer efficiency as observed on the indicating device of the utilization circuit 43. Maximum efficiency appears on the indicating device of the utilization circuit 43 as a peak in signal level and is obtained when the combination of the signal from local source 21 and the bias signal is adjusted to provide a diode conduction angle which covers substantially an odd number of half cycles of the microwave signal in passage 17. Harmonic mixing to produce a fixed I.F. signal of 2 kilomegacycles may thus be achieved with high efficiency over a band of microwave frequencies ranging from 12.4 to 40 kilomegacycles using a local signal source 21 operating over a band from 2.4 to 4 kilomegacycles using the apparatus of the present invention.

I claim:
1. Signalling apparatus comprising:
   a section of waveguide having a dielectric therein for conducting high frequency signal;
   a ridge within said body for concentrating the electric field within a gap between the top of the ridge and the opposite wall of the section of waveguide;
   a semiconductor diode disposed within said gap;
   a source of signal;
   a bias supply;
   means including a pair of conductors connected to said diode for supplying thereto a bias signal from said supply and an alternating signal from said source;
   first and second filters;
   means including the first filter connected to said conductors for absorptively terminating signal on the conductors having a frequency higher than the frequency of a selected modulation product produced by the combination of said high frequency signal and signal from said source; and
   means including the second filter connected to said con- ductors for receiving a signal having a frequency related to said modulation product.

2. Apparatus as in claim 1 wherein:
said ridge in the section of waveguide ends in a step near said diode on the side thereof along the direction of propagation of high frequency signal incident upon said section.

3. Apparatus as in claim 2 wherein:
said section includes a cavity following said step in a direction therefrom along the direction of propagation of high frequency signal incident upon said section.

4. Apparatus as in claim 3 wherein:
said cavity in the section of waveguide includes a high frequency absorptive load disposed therein for terminating incident high frequency signal.

References Cited

UNITED STATES PATENTS

| 2,436,830 | 3/1948 | Sharpless | 325—445 |
| 2,605,400 | 7/1952 | McClain | 325—445 |
| 2,813,973 | 11/1957 | McCoy et al. | 325—445 X |
| 2,850,626 | 9/1958 | Tomiyasu | 33—10 X |

KATHLEEN H. CLAFFY, *Primary Examiner.*

R. S. BELL, *Assistant Examiner.*